…

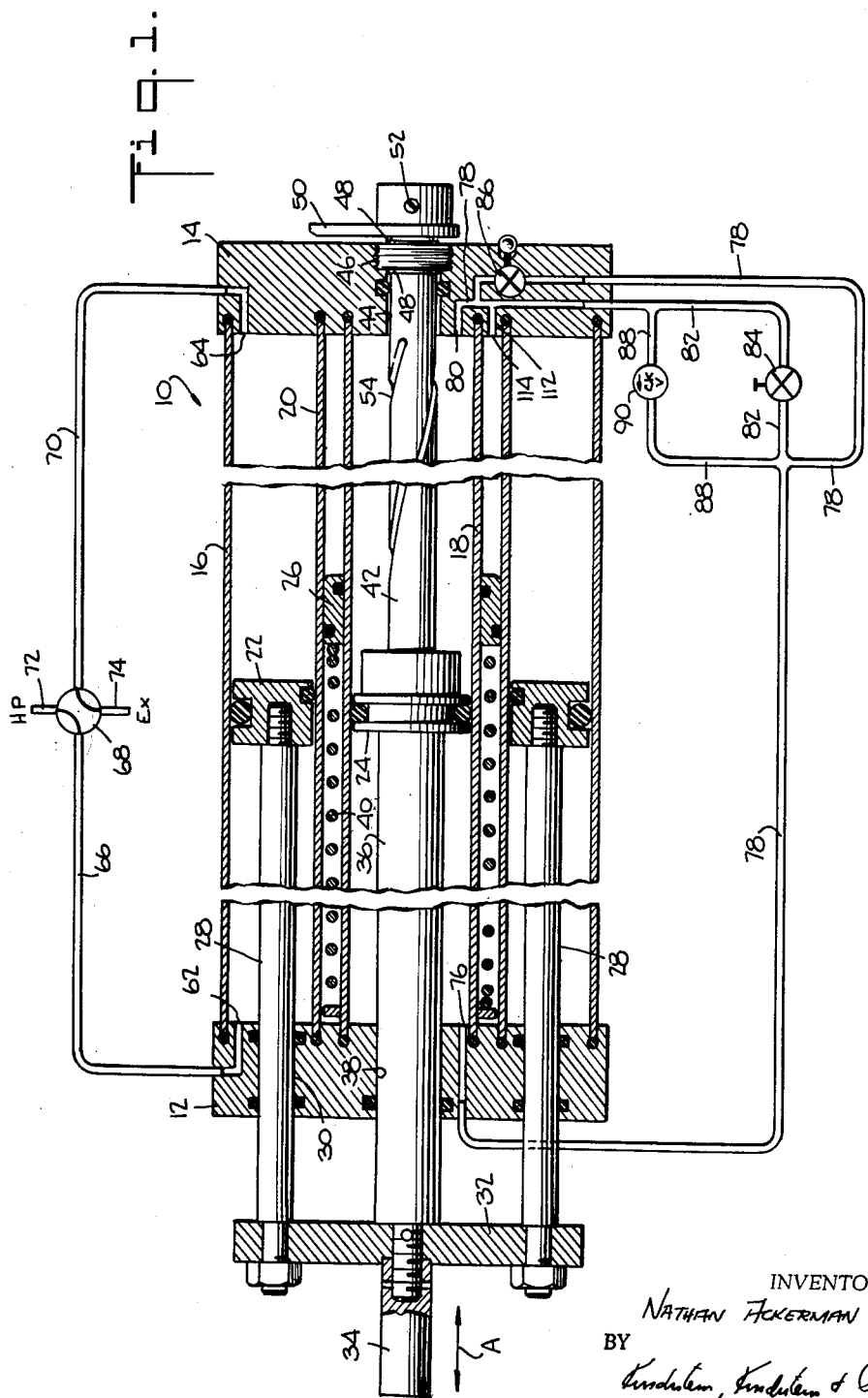

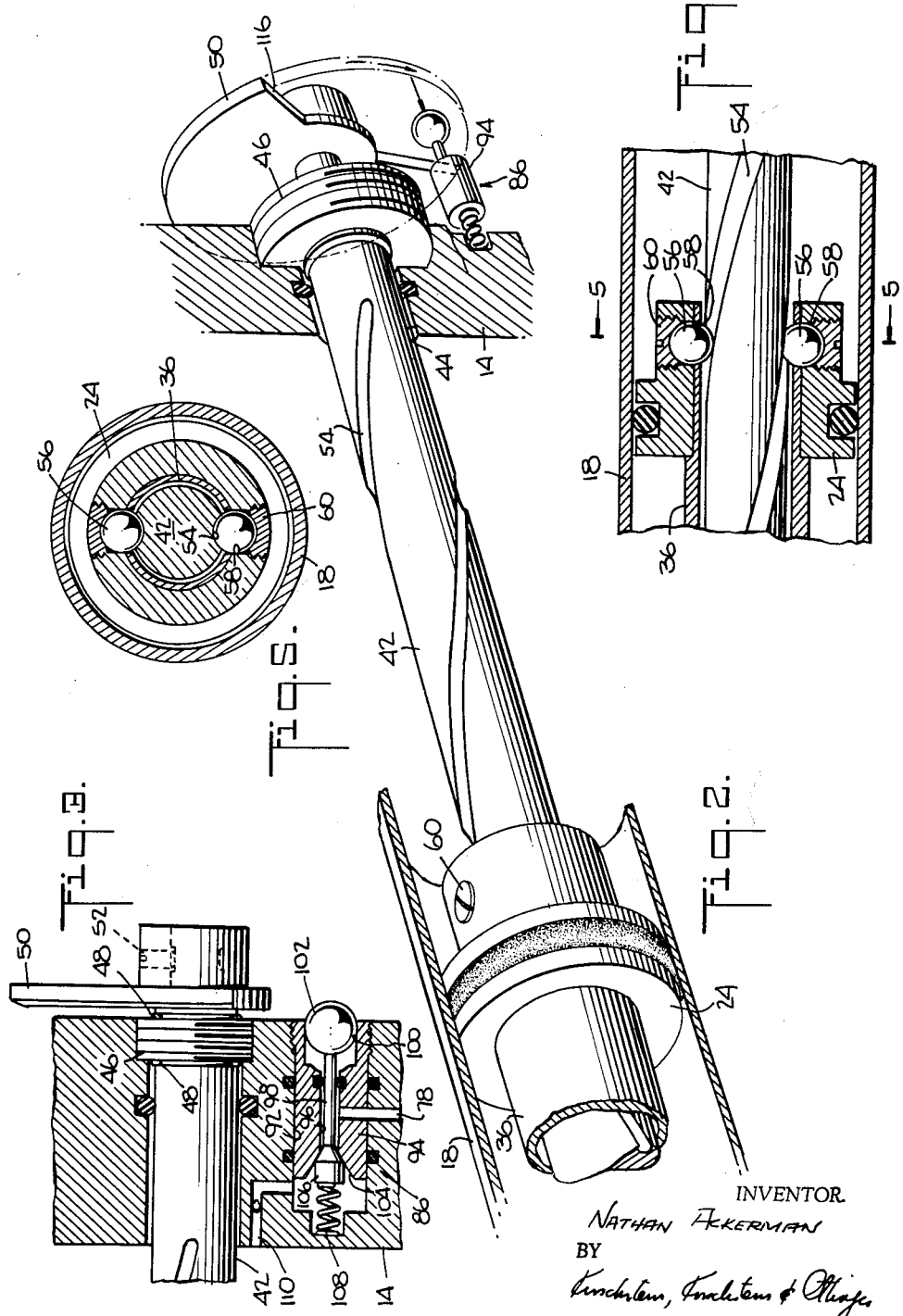

United States Patent Office 3,172,338
Patented Mar. 9, 1965

3,172,338
HYDROPNEUMATIC ACTUATOR
Nathan Ackerman, Lake Success, N.Y.
(% Sandex, Inc., 678 Berriman St., Brooklyn, N.Y.)
Filed May 27, 1963, Ser. No. 283,368
19 Claims. (Cl. 92—11)

This invention relates to hydropneumatic actuators. More particularly my invention is concerned with hydropneumatic actuators which are employed to controllably drive a member. In substantially all applications thereof such actuators are employed to reversably move a member in opposite directions by power. For example, actuators of the character aforesaid are utilized to reciprocate the tool of a lathe, or the turret of a screw machine, or the head of a drill press, or the cutter of a planer, or the bed of a milling machine, etc.

The root "hydro" in the adjective "hydropneumatic" denotes the presence of a liquid, i.e. an incompressible fluid such as oil or water, and the root "pneuma" the concurrent presence of a gas, i.e., an elastic fluid such as air.

Specifically, my invention is concerned with a hydropneumatic actuator that is powered pneumatically, i.e. with compressed air, and that for control purposes is restrained hydraulically, i.e. by an incompressible liquid, oil being preferred. By selectively restricting the flow of the oil in a closed circuit and by interconnecting the movable hydraulic and pneumatic components the rate at which the actuator drives a member can be varied and thereby set to any selected speed; and by changing the direction in which compressed air drives the actuator, the direction of movement of the member, e.g. either infeed or outfeed, can be altered. Actuators of this type are highly desirable because of their brisk speedy movement, compactness, low cost of manufacture, low cost of operation and maintenance, and low cost of auxiliary equipment.

Since the oil flows in a closed circuit it is necessary for various reasons to connect this circuit to a reservoir. For example, despite the use of excellent seals throughout the hydraulic portion of the actuator there is upon occasion some leakage of oil which must be replaced for the actuator to remain effective. Also when the temperature of the oil changes it will experience expansion or contraction and change its volume with respect to the volume of the closed circuit in which it flows. The oil is incompressible so that any excess of oil in the circuit must be fed to the reservoir and any shortage of oil in the circuit must be supplied from the reservoir. Furthermore, the actuator may be provided with a hydraulic element which to at least some extent moves into and out of the oil-filled closed circuit. The change in displacement of oil caused by such movement of this hydraulic element, which may be a piston rod or a valve, may not be offset by movement of some other element into or out of the closed circuit and therefore any consequent oversupply or shortage of oil in the hydraulic circuit must be fed into or supplied from the reservoir.

The reservoir may be located at a site remote from the actuator. However this is poor practice because it entails lengthening of conduits and, more importantly, because it involves the presence of additional connections that must be sealed and which can cause trouble due to leakage. It is better practice to mount the reservoir on the actuator itself. This has the obvious virtue of shortening conduits and of reducing the number of external connections. Nevertheless, some external connections still are present because the reservoir is on the outside of the actuator.

To further shorten the conduits it is the current practice to locate the reservoir at an end of the actuator. This arrangement, too, has its drawbacks, although it is in current use, because it adds appreciably to the length of the actuator. As will be understood by persons skilled in the use of machine tools it is habitual in machine shops to crowd the machine tools together. A hydropneumatic actuator frequently is added to an existing, already installed machine tool. It usually is placed near an outside contour of the machine tool and often projects beyond the original machine tool dimensions. It therefore is highly desirable to make hydropneumatic actuators as compact as possible and this desirable attribute is difficult to secure where the reservoir is mounted on the end of an actuator.

It is an object of my invention to provide a hydropneumatic actuator which avoids the foregoing drawbacks.

More specifically it is an object of my invention to provide a hydropneumatic actuator which is particularly compact both diametrically (in girth) and longitudinally.

It is another object of my invention to provide a hydropneumatic actuator in which the reservoir is incorporated as a unitary portion of the actuator with only a slightly noticeable increase in the size thereof.

It is another object of my invention to provide a hydropneumatic actuator including a reservoir which is so structurally integrated into the actuator as to aid in preventing skewing of other actuator components.

More specifically, it is an object of my invention to provide a hydropneumatic actuator in which the hydraulic and pneumatic components are at least partially mutually overlapping and in which the reservoir components in turn at least partially mutually overlap at least one and preferably both of the hydraulic and pneumatic components, thereby preventing any increase in length to the reservoir at the expense at only a slight increase in girth.

It is an even more specific object of my invention to provide a hydropneumatic actuator wherein the hydraulic and pneumatic components are coaxial and substantially coextensive, that is to say, are effectively nested one within the other, and further wherein the reservoir is coaxial and coextensive with the hydraulic and pneumatic components so that, in effect, the hydraulic, the pneumatic, and the reservoir components are mutually internested.

It is another object of my invention to provide a hydropneumatic actuator in which the reservoir is so situated as to impart a cooling influence on the oil flowing in the hydraulic circuit. In this connection it will be observed that when the oil in the hydraulic circuit is forced through a restricted passageway in order to restrain, i.e. check, the movement of the driven member by the pneumatic components the oil temperature rises. It is desirable to keep this temperature from rising too greatly and thereby creating vapor bubbles or causing deterioration of the oil. Pusuant to the foregoing object of my invention the reservoir is placed in good heat exchange relationship with the hydraulic components so as to provide a heat sink that will efficiently and appreciably reduce the temperature of the oil in the hydraulic circuit.

As has been indicated above, the infeed or outfeed rate of advance of the member powered by the pneumatic components is controlled by varying the rate of flow of the oil in the hydraulic circuit. Such variation in the rate of oil flow is accomplished by actuation of one or more valves. For example, the oil may flow in a low friction head hydraulic conduit and a portion of the conduit may be connected in parallel with another conduit having a high friction head. Said portion of the low friction head conduit may include an off-on valve which in effect acts as a shunting valve. When it is open the mentioned portion of the low friction head conduit bypasses the high friction head conduit but when the valve is closed oil is shunted through the high friction head conduit. Heretofore, the shunting valve has been opened and closed by sundry arrangements, as for example by an electric mechanism such as a solenoid, or by axial movement of an elongated element such movement being a function of movement of the member driven by the pneumatic components. Although both such arrangements have proved to be extremely practical, accurate and reasonably easy to maintain, they sometimes are comparatively expensive or difficult to install or manufacture.

It is, accordingly, a further object of my present invention to provide a hydropneumatic actuator having a simpler arrangement for controlling flow of the oil in the hydraulic circuit to direct it to alternative paths having either high or low friction heads.

It is another object of my invention to provide a hydropneumatic actuator in which the arrangement for controlling the flow of oil as aforesaid is less expensive and easier to install than previous arrangements and yet is sufficiently reliable and accurate and also faster and easier for changing of setups.

It is a more specific object of the latter phase of my invention to provide a hydropneumatic actuator in which the flow of oil in the hydraulic circuit is controlled as aforesaid by converting linear motion of a component of the actuator to rotary motion of a rotary member that actuates the shunting valve or the like.

Even more specifically it is an object of my invention to provide a hydropneumatic actuator in which the aforesaid conversion arrangement is incorporated within the actuator proper, that is to say within the hydraulic or pneumatic components so as to minimize the overall length of the actuator and so as to reduce the number of oil seals that have to be utilized.

It is another object of my invention to provide a hydropneumatic actuator wherein such an internal conversion arrangement, that is to say an arrangement for converting linear movement of one of the linearly moveable parts into rotary movement, is employed to obtain a rotary output that can be used for any purpose whatsoever, e.g. to actuate a shunting valve or the like or simply to rotate a member to be driven by the actuator.

It is an ancillary object of my invention to provide a hydropneumatic actuator in which through the use of an internal conversion arrangement of the character described the actuator can be employed as a rotary power drive, for instance to turn a gear engaging a rack.

Other objects of my invention in part will be obvious and in part will be pointed out hereinafter.

My invention accordingly consists in the features of construction, combinations of elements and arrangements of parts which will be exemplified in the apparatus hereinafter described and of which the scope of application will be indicated in the appended claims.

In the accompanying drawings, in which is shown one of the various possible embodiments of my invention, FIG. 1 is a fragmentary axial, longitudinal, sectional view through a hydropneumatic actuator constructed in accordance with my invention, the pneumatic and hydraulic circuits being illustrated schematically;

FIG. 2 is a fragmentary perspective view of the conversion mechanism and the shunting valve;

FIG. 3 is an axial longitudinal section view through the shunting valve and its operator;

FIG. 4 is an axial longitudinal sectional view through the conversion mechanism; and FIG. 5 is a transverse sectional view through the conversion mechanism the same being taken substantially along the line 5—5 of FIG. 4.

In general I carry out my invention by providing a first cylinder in which a fluid actuable first piston is relatively reciprocable, a second cylinder in which a liquid checking second piston is relatively reciprocable and a third cylinder in which a third reservoir piston is relatively reciprocable. The three cylinders are concentric and at least partially, mutually overlapping. The first piston subdivides the first cylinder into two chambers and a fluid under pressure is alternately admitted to these chambers to drive the first piston in one direction or another. The second piston subdivides the second cylinder into two chambers which are interconnected by a closed circuit with a low friction head, this circuit and the chambers interconnected thereby being filled with a liquid. The closed circuit includes a shunting valve which is bridged by a conduit having a high friction head. The position of the second piston with respect to the second cylinder is arranged so that it is a function of the position of the first piston with respect to the first cylinder whereby when relative movement between the first piston and first cylinder drives a member under the influence of the actuating fluid such movement will be checked by relative movement of the second piston and second cylinder, the degree of checking being changed when the shunting valve is either opened or closed. The third piston subdivides the third cylinder into two chambers. Conduit means is included to connect the liquid filled closed circuit to one of the chambers into which the third cylinder is subdivided so that such chamber can act as a reservoir for the liquid in the closed circuit. By thus locating the reservoir's cylinder in the aforesaid at least partially mutually overlapping position with respect to the first and second cylinders the length of the actuator need not be increased and there is only a slight increase in girth. Moreover the reservoir cylinder as thus disposed is in good heat exchange relationship with the liquid cylinder and thereby can function as a heat sink.

Furthermore, the movable element of one of the first two piston-cylinder pairs has a conversion mechanism associated with it, preferably in the form of an elongated straight member which lies in the path of travel of such element. The said member is provided with a spiral irregularity and the movable element is provided with a matching irregularity. The member is mounted to permit it to rotate but is constrained against axial movement. Thereby when the movable element translates in either direction the elongated member is caused to rotate. Such rotation can be employed simply as a rotary power drive, for instance to turn a part that has to be driven, as for example a gear. Such rotation also can be employed to actuate the shunting valve since the rotation is a function of the movement of the movable element of the actuating piston-cylinder pair. Thus the conversion mechanism can be located internally of the actuator to keep the size of the actuator to a minimum and in general to simplify the operation, maintenance and appearance of the actuator.

Although the basic actuator as thus described is of a relatively simple construction, it will be understood by people skilled in the art that it is capable of being refined in sundry fashions while retaining the parts which have been catalogued. Thus the alternate feed of the actuating fluid to either of the two chambers of the first cylinder can be controlled manually or the control can be automatic. Automatic controls for this purpose are illustrated in my issued United States Letters Patent No. 3,043,278, dated July 10, 1962, and in my copending applications Serial No. 737,092, filed May 22, 1958, now Patent No. 3,107,581, issued October 22, 1963, for Hydropneumatic Feed Device, and Serial No. 94,570, filed March 9, 1961, now Patent No. 3,124,044, issued March 10, 1964, for Hydropneumatic Drive Mechanism. For instance, the reversal of the supply of actuating fluid can be controlled by a drop of pressure in the closed liquid circuit caused by an abutment that stops the movement of the actuator in either direction or it can be controlled by mechanical, hydraulic or electric sensing means.

For the purpose of simplifying the present disclosure the actuator hereinafter described has been illustrated as one which experiences one change from a fast feed to a slow feed at a selected point of the infeed cycle. If desired there could be more than one change, or the change could be between more than two rates of speed or the change could be at different points of the infeed cycle or successive cycles as for instance if the actuator is to be used in connection with a turret lathe where the tools may be designed to engage the work for different turret positions at different points on the work, such latter modification being illustrated in my aforesaid patent and copending applications.

Still further, although I have illustrated the actuator with a fast-slow feed only on the infeed stroke it likewise is within the scope of my invention to provide a fast-slow feed on the outfeed stroke as shown in my Patent No. 3,124,044, referred to above.

The actuator can be further modified so that either any piston or the cylinder associated with it is movable. Thus, in the actuator illustrated and described all the cylinders are stationary and all the pistons are movable. This condition can be reversed for any piston and associated cylinder or for any combinations of pistons and cylinders. However, for the purpose of facilitating comprehension of the present invention the actuator has been shown in its simplest embodiment without any or all of the above mentioned refinements.

Referring now in detail to the drawings, the reference numeral 10 denotes a hydropneumatic actuator constructed in accordance with my invention. Said actuator includes a front end plate 12 of thick metal and a rear end plate 14 that likewise is of thick metal. These plates are spaced apart by a distance somewhat in excess of the maximum stroke required for the actuator and may be held in this spaced relationship by means of tie rods or a frame so as to rigidly interconnect the plates. However, as will be seen shortly such interconnection between aforesaid parts is not essential since the various cylinders can, if desired, be relied upon for this mechanical purpose.

Extending between the two end plates 12, 14 are three cylinders, to wit, a first cylinder 16 which is the outermost of the three cylinders and which is designed to have admitted thereto the actuating fluid, a second cylinder 18 which is the innermost of the three cylinders and which is designed to contain a liquid, i.e. an incompressible fluid and preferably oil, and a third cylinder 20 which is disposed between the first and second cylinders and which is designed to serve as a reservoir. The three cylinders are nested one within the other, the cylinders being coaxial, i.e. concentric, and coextensive. The ends of the three cylinders are set into grooves in the facing surfaces of the front and rear end plates 12, 14 and are suitably sealed therein as with gaskets, as shown, or with the aid of sealing O-rings. Preferably to avoid the imposition of tensile stresses on the joints between the cylinder ends and the plates, the plates are independently tied together in the fashion mentioned earlier herein. By virtue of the nested relationship just described it will be appreciated that the oil cylinder 18 defines a cylindrical space for the accommodation of oil, that the reservoir cylinder 20 defines in conjunction with the outside of the oil cylinder an annular space in which oil can be stored and that the actuating cylinder 16 defines in conjunction with the reservoir cylinder 20 an annular space for the admission of the actuating fluid.

Each of the three cylinders has a different piston associated therewith to form a piston-cylinder pair, the pistons corresponding to the shapes of the spaces in which they are to be reciprocable. Thus there is slidable in the actuating cylinder 16 an annular fluid actuatable piston 22. There is slidable in the liquid cylinder 18 a circular liquid checking piston 24. There is slidable in the reservoir cylinder 20 an annular reservoir piston 26. Each of the pistons is provided with sealing O-rings and subdivides the associated cylinder into two chambers. Thus the fluid actuatable piston 22 has an outer O-ring which slidingly seals the joint between the outer periphery of this piston and the inner surface of the actuating cylinder 16 and an inner O-ring which slidingly seals the joint between the inner periphery of this piston and the outer surface of the reservoir cylinder 20. Similar inner and outer O-rings are included for the reservoir piston 26. The liquid checking piston 24 requires only an outer O-ring inasmuch as this piston is circular rather than annular in cross-sectional configuration.

Twin piston rods 28 are secured to the same face of the fluid actuatable piston 22. For balancing stresses these piston rods are located at diametrically opposite points of said piston. The piston rods, of course, are parallel to one another and to the longitudinal axis of the actuator, this being the direction A in which the various pistons and rods are reciprocated. Said actuating piston rods 28 extend through slide passageways 30 in the front end plate 12 and at their front ends the actuating piston rods are tied together by a yoke 32. A drive rod 34 fast to the front center portion of the yoke is adapted to be connected to a member to be driven by the actuator 10.

Attached to the front end of the liquid checking piston 24 is a liquid checking piston rod 36 which likewise extends forwardly and which is fast to the center of the yoke 32. Said liquid checking piston rod passes through a slide passageway 38 in the front end plate. The liquid checking piston rod is midway between and parallel to the fluid actuatable piston rods 28. All of the slide passageways are provided with sealing O-rings to engage the piston rods and prevent leakage of actuating fluid or checking liquid. To minimize the length of the actuator the fluid actuatable piston and liquid checking piston are in approximate transverse registry.

For reasons which later will be apparent the liquid checking piston rod 36 is hollow from the liquid checking piston 24 forwardly for the greatest part of its length, this being best illustrated in FIGS. 2, 4 and 5.

It now will be clear that the position of the liquid, i.e. oil, checking piston within its associated liquid checking cylinder is a function of the position of the fluid actuatable piston within the actuating cylinder so that relative movement of the fluid actuatable piston with respect to its cylinder is necessarily accompanied by relative movement of the liquid checking piston with respect to its cylinder. This correlation is essential in order for the movement of the liquid checking piston within the liquid cylinder to be able to control the rate of movement of the fluid actuatable piston within its cylinder.

Desirably, a spring, e.g. a helical compression spring 40, is located within the annular reservoir space and biases the annular reservoir piston 26 in one direction, i.e. to the right as illustrated in FIG. 1.

Pursuant to a feature of my invention the actuator 10 has incorporated therewithin a conversion mechanism which changes the linear motion of the yoke 32 and, specifically, of the liquid checking piston 24 into a rotary motion. Such rotary motion can be used as a positive drive, e.g. to turn a gear of a drill press, or it can be used to motivate a control element of the actuator itself, for instance the operator for the shunting valve. Said conversion mechanism is characterized by its great simplicity and by its integration into the actuator at a point within the physical confines of the actuator cylinders, specifically within the physical confines of the liquid checking cylinder. Thus the conversion mechanism is sealed where it is protected from intrusion of foreign particles, it is constantly lubricated by the liquid and it does not increase the overall length of the actuator.

Specifically the conversion mechanism comprises an elongated straight member such as a rotary shaft 42 contained within the liquid checking cylinder 18 and preferably located on the longitudinal axis thereof. This shaft is aligned with the liquid checking piston rod 36 and as the actuator reciprocates it is telescopically received within the hollow rod 36 or is partially withdrawn therefrom.

At its rear end the rotary shaft 42 is revolvably journalled in the rear end plate 14 and moreover is there captively restrained against axial movement. For this purpose the rear end plate is provided with a central passageway 44 through which the shaft 42 extends. The rotary joint between the shaft and passageway is sealed by an O-ring. The rear end portion of this shaft is reduced and mounts a fixing collar 46. The collar is free to rotate with respect to the shaft but is held against axial movement relative thereto by C-rings 48 received in annular grooves in the shaft and one located adjacent each face of the collar. The periphery of the collar is threaded to mesh with a tapped enlarged portion of the passageway 44. Thereby when the collar is screwed home in the passageway the aforesaid captive segment of the shaft is rotatable but fixed, that is to say the shaft now is free to rotate with respect to the end plate 14 but cannot shift axially.

The rear end of the shaft protrudes from the rear face of the rear end plate 14 to receive a shunting valve actuator 50 in the form of a hubbed disc of generally circular contour, and that is angularly adjustably held to the shaft as by a set screw 52. For a reason which later will be described one or more portions of the disc are cut away.

The major length of the rotary shaft 42, and, more particularly, substantially the full length of said shaft that is exposed to the interior of the liquid checking cylinder 18, is provided with at least one helical irregularity. As illustrated two such irregularities are provided in the form of helical grooves or flutes 54. These flutes are equiangularly spaced about the shaft to form what is effectively a double pitched fluting. In the form of the invention herein described where it is only desired to turn the valve actuator through less than 360° for a full stroke of the actuator 10 each helical groove 54 turns through less than 360° over its entire length. It will be understood however that if the conversion mechansim is to provide for more than one turn of the rotary shaft the helical flutes can be of shorter pitch so as to obtain the desired number of revolutions for a single stroke of the actuator 10. However in no event should the pitch of the groove be so short as to bind the conversion mechanism.

The liquid checking piston 24 is provided with irregularities to match the cross-section of the helical irregularities on the rotary shaft 42. In the form of the invention herewith illustrated the irregularities carried by the liquid checking piston assume the form of a pair of drive balls 56 which respectively engage the follower grooves 54 in the rotary shaft 42. The balls are dimensioned to freely ride on the grooves. Said balls are located in diametrically opposed radial openings 58 in the rear end of the liquid checking piston rod 36 and in the hub of the liquid checking piston 24. The outer ends of these openings are threaded to receive cap screws 60 that close the openings and maintain the drive balls in engagement with the helical grooves. The liquid checking piston 24 is fast on the liquid checking piston rod 36 which cannot turn because it is fast to the non-rotating yoke 32. Hence when the liquid checking piston 24 experiences movement in either direction within its cylinder 18 and the drive balls experience a simple translatory movement parallel to that of the drive rod 34, said balls will cause the follower grooves and therefore the rotary shaft 42 to turn in the collar 46 and end plate 14 whereby to rotate the shunting valve actuator 50 or any other drive member that may be affixed to the protruding end portion of the rotary shaft.

The fluid actuatable piston 22 divides the annular actuating space into two chambers and the actuator is supplied with an actuating fluid, e.g. compressed air, which is alternately supplied to one or the other of these chambers while the other chamber is connected to low pressure, i.e. exhausted, e.g. to the atmosphere. As indicated previously the alternate supply of the actuating fluid to the two chambers can be accomplished manually or in various automatic fashions and I have shown a simple circuit arrangement for effecting this supply of pressure fluid inasmuch as this phase of the actuator is standard and the particular means employed is not critical to the operation of my invention. Thus in the front end plate 12 I provide an outfeed port 62 and in the rear end plate I provide an infeed port 64. The outfeed port 62 is connected by a conduit 66 to a four-way valve 68 and the infeed port 64 is connected by a conduit 70 to said four-way valve. Also connected to said four-way valve is a source 72 of compressed gas, e.g. compressed air, and a source of low pressure 74, e.g. an exhaust conduit leading to the ambient atmosphere.

When the valve is in the position indicated in FIG. 1, high pressure air is connected to the outfeed port and the infeed port is connected to exhaust so that the annular fluid actuatable piston 22 will be moved from left to right shifting the drive rod 34 in an outfeed direction. If the four-way valve is turned 90° in a counter-clockwise direction as viewed in FIG. 1 these connections will be reversed so that compressed air will be supplied to the infeed port 64 and the drive rod 34 will be moved in an infeeding direction.

Obviously because the fluid actuatable piston and the liquid checking piston are interconnected for common movement the fluid actuatable piston only can translate as rapidly as the liquid checking piston will permit.

Movement of the liquid checking piston is restrained by including this piston in a closed liquid flow circuit. Said circuit runs between the two chambers into which the liquid checking cylinder is divided by the liquid checking piston. Thus, in the front end plate 12 there is provided a port 76 connected by a conduit 78 to a port 80 in the rear end plate. Both these ports are aligned with the ends of the liquid checking cylinder. The two chambers of the liquid checking cylinder on opposite sides of the liquid piston, the ports 76 and 80 and the conduit 78 are completely filled with a liquid, e.g. oil, and the frictional resistance to flow of the oil in this closed circuit is low but will to some extent hold back (restrain, i.e. check) the movement of the fluid actuatable piston in both directions.

As indicated previously this frictional resistance (head) can be quickly changed to rapidly vary the rate of feed of the drive rod 34. To this end the conduit 78 has a portion thereof connected in parallel with (bridged by) a conduit 82 in which there is included a restriction valve 84. This valve for example may constitute an adjustable needle valve so that the conduit 82, because of such valve, has a high friction head.

The portion of the conduit 78 thus bridged by the conduit 82 includes a shunting valve 86 which is of the off-on variety. When the shunting valve is open and the liquid actuatable piston moves, the oil flowing between the two chambers of the oil checking cylinder principally takes the path of least frictional resistance through the shunting valve and the full length of the low friction head conduit 78 so that the drive rod is moved with comparative rapidity. But as soon as the shunting valve is closed flow of oil will be diverted to pass exclusively through the conduit 82 and the restriction valve 84 whereby at such time the movement of the drive rod will be considerably slower, depending upon the setting of the restriction valve 84.

As illustrated, the variation in speed of movement of the actuating piston only can be effected during the infeed stroke. But, obviously, as shown in my applications Serial Nos. 737,092, now Patent No. 3,107,581, issued October 22, 1963, and 94,570, now Patent No. 3,124,044, issued March 10, 1964, such variation can be effected on both strokes, only one having been shown herein in order to simplify the disclosure.

To enable the fluid actuatable piston to return at full speed I provide a second bridging conduit 88 which shunts the restriction valve 84 and includes a check valve 90 permitting relatively free flow of oil therethrough during an outfeed stroke so that on the feedout stroke of the actuator, regardless of the position of the shunting valve, a low friction head path will be provided between the ports 76 and 80.

Any suitable construction can be employed for the shunting valve 86 and the details of one such construction is illustrated in FIG. 3. Said shunting valve comprises a rearwardly opening bore 92 in the rear end plate 14, the mouth of the bore being tapped. Located within the bore is a valve body 94 the rear end of which is threaded to engage the tapped section of said bore. An O-ring seals the valve body against the walls of the bore. The valve body includes a central passageway 96 in which a valve spindle 98 is slidable with longitudinal and circumferential clearance, said spindle being sealed in the passageway by an O-ring. The rear end of the valve body is formed with a socket 100 in which is captively retained a ball-shaped operator 102 bearing on the back of the spindle 98. The forward end of the valve body is provided with a conical seat 104 surrounding the passageway 96 and similarly the forward end of the spindle 98 is provided with a conical plug 106, the configuration of which matches that of the seat. A helical compression spring 108 having an end seated in a depression at the front end of the bore 92 urges the plug 106 against its matching seat 104.

The operator 102 is spaced from the bottom of the socket 100 when the plug 106 engages the seat 104. Thereby when the operator is urged forwardly, as by the shunting valve rotary actuator 50, the plug 106 will lift off the seat to provide a gap between the seat and plug and thus form a space communicating between the front end of the bore 92 and the clearance between the spindle 98 and the central passageway 96. A conduit 110 runs from the front end of the bore 92 to the port 80.

A conduit 112 connects the low pressure port 80 at the right hand end of the oil checking cylinder 18 to a port 114 at the right hand end of the oil reservoir space, said port 114 thereby being exposed to the right hand chamber into which the oil reservoir space is subdivided by the oil reservoir piston 26. This oil reservoir chamber is filled with oil whereas the opposite chamber in which the spring 40 is located is filled with gas, indeed said opposite chamber preferably is vented to the atmosphere.

In the operation of the actuator, compressed air admitted to the infeed port 64 will drive the fluid actuating piston 22 and the yoke 32 to the left as shown in FIG. 1 which will translate the drive rod 34 in such a direction as to feed the tool of a machine toward a work piece. Movement of the yoke 32 will be restrained by the friction head of the oil passing from the left hand chamber within the oil checking cylinder in succession through the port 76, the conduit 78, the then open shunting valve 86 and the port 80. As the liquid checking piston 24 travels to the left along with the yoke 32, causing the oil to flow in the aforesaid closed circuit to the right hand oil checking chamber, only a moderate restraint is exercised.

The aforesaid movement of the piston 24, through the medium of the driving balls 56 and helical follower flutes 54, will rotate the shaft 42 and thereby turn the rotary actuator 50. The rotary actuator is provided with a notch or gap 116. As soon as the notch reaches the ball-shaped operator 102 of the shunting valve 86 it will release the shunting valve from its open position which it maintains during rapid infeed travel and allows the valve to close under the influence of the spring 108. Upon closure of the shunting valve the oil is diverted to the alternate, i.e. bridging path, through the restriction valve 84, which, because it provides a higher friction head, slows down movement of the piston 24 and thereby movement of the piston 22 and the yoke 32. Hence as long as the notch is over the operator 102 the actuator 10 moves the yoke 32 in an infeed direction at a slow rate of speed.

If desired more than one notch may be provided.

It will be appreciated that because of the linear to rotary conversion mechanism constituting the driving balls 56 and the spirally fluted shaft 42 the change over from fast feed rate to slow feed rate, or vice versa, is controlled by a rotary member the angular position of which is a function of the linear position of the yoke 32 and, of course, of the linearly movable elements of the fluid actuating and checking piston-cylinder pairs.

It further is to be observed that since the conversion mechanism is contained within the hydropneumatic actuator 10 it is in a protected position and it does not appreciably increase the size of said hydropneumatic actuator. The increase of length is negligible, consisting only of the output end of the shaft 42 to which the rotary actuator 50 is connected since the major portion of said shaft is contained in the oil checking cylinder.

On the outfeed stroke compressed air is admitted to the outfeed port 62 and the infeed port is connected to the atmosphere. Thereupon the fluid actuable piston 22 is driven to the right as seen in FIG. 1 so as to retract the drive rod 34 and the tool of the machine to which it is connected. As shown, the actuator 10 has an outfeed stroke which is rapid over its full length although, as previously indicated, an arrangement similar to the fast-slow arrangement for the infeed stroke could be employed. On the outfeed stroke oil flows in the colsed circuit and bypasses the restriction valve through the check valve 90 when the shunting valve is closed.

On the two strokes, i.e. infeed and outfeed, of the liquid checking piston 24 the displacements of oil in the two chambers of the cylinder 18 are unequal due to the difference in diameters of the piston rod 36 and the shaft 42. Any excess of oil present in the right hand oil chamber will flow through the port 80 the conduits 78 and 112 and the port 114 into the oil reservoir to the right of the oil reservoir piston 26. Any shortage of oil present in the right hand oil chamber will be supplied by flow of oil from the reservoir through the aforesaid circuit. It will be observed that, as is customary in hydropneupmatic actuators, the reservoir never is connected to high pressure oil on the infeed side of the restriction valve when that valve is effective (the shunt valve being closed). Where a slow feed is required on the outfeed stroke of the actuator the reservoir is connected by valves and alternate conduits to the left hand chamber (as viewed in FIG. 1) of the oil cylinder as shown in my said copending applications.

It will be observed that the protruding end of the rotary shaft 42 which revolves as a function of the linear movement of the actuator is an output shaft that can be employed to drive a power mechanism which requires a rotary input, as, for example, a gear of a drill press which gear engages a rack on a vertical shaft that carries a drill.

It thus will be seen that I have provided a device which achieves the several objects of my invention, and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

Having thus described my invention, I claim as new and desire to secure by Letters Patent:

1. A hydropneumatic actuator comprising:
 (a) a first cylinder,
 (b) a fluid actuable first piston in and reciprocable relative to said first cylinder and subdividing said first cylinder into two chambers,
 (c) a second cylinder,
 (d) a liquid checking second piston in and reciprocable relative to said second cylinder and subdividing said second cylinder into two chambers,
 (e) a third cylinder,
 (f) a reservoir piston in and reciprocable relative to said third piston and subdividing said third cylinder into two chambers, (g) said three cylinders being concentric and at least partially mutually overlapping, (h) means interconnecting the first and second cylinders and pistons so that the position of the second piston relative to the second cylinder is a function of the position of the first piston relative to the first cylinder, (i) means to supply a fluid under pressure alternately to the two chambers of the first cylinder to drive the first piston relative to the first cylinder alternately in opposite directions, (j) a closed circuit with a low friction head interconnecting the two chambers of the second cylinder, (k) means providing an alternate circuit with a high friction head connecting the two chambers of the second cylinders, (l) a liquid filling the two chambers of the second cylinder and both circuits, (m) valve means to selectively render only one of said circuits effective to control the rate of movement of the first piston relative to the first cylinder, (n) one of the chambers of the third cylinder constituting a reservoir, (o) said reservoir being filled with liquid, (p) and a liquid filled path connecting the reservoir to at least one of the chambers of the second cylinder.

2. A hydropneumatic actuator as set forth in claim 1 which further includes means biasing the reservoir piston relative to the third cylinder in a direction reducing the volume of the chamber of the third cylinder that constitutes the reservoir.

3. A hydropneumatic actuator as set forth in claim 1 which further includes a mechanical element located within the liquid filling the chamber of the second cylinder and the circuits and wherein means is included for moving said element into and out of said liquid, the change in displacement of the liquid caused by such movement being compensated for by the liquid in the reservoir.

4. A hydropneumatic actuator as set forth in claim 3 wherein the mechanical element is a piston rod connected to the second piston.

5. A hydropneumatic actuator as set forth in claim 1 wherein the three cylinders are fixed with respect to one another and wherein the first and second pistons are interconnected for common movement.

6. A hydropneumatic actuator as set forth in claim 5 wherein the three cylinders are coextensive.

7. A hydropneumatic actuator as set forth in claim 6 wherein the third cylinder is disposed between the first and second cylinders.

8. A hydropneumatic actuator as set forth in claim 1 wherein the third cylinder is disposed between the first and second cylinders.

9. A hydropneumatic actuator as set forth in claim 1 which further includes a rotary actuator for the valve means and a conversion mechanism for rotating said actuator as a function of relative linear movement of the first and second pistons with respect to the first and second cylinders.

10. A hydropneumatic actuator comprising:
(a) a first cylinder,
(b) a fluid actuable first piston in and reciprocable relative to said first cylinder and subdividing said first cylinder into two chambers,
(c) a second cylinder,
(d) a liquid checking second piston in and reciprocable relative to said second cylinder and subdividing said second cylinder into two chambers,
(e) said two cylinders being concentric and at least partially mutually overlapping,
(f) means interconnecting the first and second cylinders and pistons so that the position of the second piston relative to the second cylinder is a function of the position of the first piston relative to the first cylinder, (g) means to supply a fluid under pressure alternately to the two chambers of the first cylinder to drive the first piston relative to the first cylinder alternately in opposite directions, (h) a closed circuit with a low friction head interconnecting the two chambers of the second cylinder, (i) means providing an alternate circuit with a high friction head connecting the two chambers of the second cylinder, (j) a liquid filling the two chambers of the second cylinder and both circuits, (k) valve means to selectively render only one of said circuits effective to control the rate of movement of the first piston relative to the first cylinder, (l) a rotary actuator for said valve means, and (m) a conversion mechanism for rotating said actuator as a function of relative linear movement of the first and second pistons with respect to the first and second cylinders.

11. A hydropneumatic actuator as set forth in claim 10 wherein the conversion mechanism is contained within the second cylinder.

12. A hydropneumatic actuator as set forth in claim 11 wherein the conversion mechanism includes an elongated straight member disposed within the second cylinder and a member carried by the second piston, one of said members having a spiral irregularity, the other of said members having a matching and meshing irregularity, one of said members being non-rotatable, the other of said members being rotatable and connected to the rotary actuator for the valve means so as to revolve the same.

13. A hydropneumatic actuator as set forth in claim 12 wherein the elongated straight member is formed with the spiral irregularity and wherein means is provided to mount said straight member for rotation and to restrain said straight member against axial movement relative to the second cylinder.

14. A hydropneumatic actuator as set forth in claim 13 wherein the spiral irregularity is a groove and wherein the matching irregularity of the member carried by the second piston is a ball.

15. A hydropneumatic actuator as set forth in claim 10 wherein the valve means includes an operator and wherein the rotary actuator includes a disc disposed to engage the operator, said disc having a notch so that when an edge of the notch passes over the operator the valve means is moved from one position to another position.

16. A hydropneumatic actuator comprising:
(a) a first cylinder,
(b) a fluid actuable first piston in and reciprocable relative to said first cylinder and subdividing said first cylinder into two chambers,
(c) a second cylinder,
(d) a liquid checking second piston in and reciprocable relative to said second cylinder and subdividing said second cylinder into two chambers,
(e) said two cylinders being concentric and at least partially mutually overlapping,
(f) means interconnecting the first and second cylinders and pistons so that the position of the second piston relative to the second cylinder is a function of the position of the first piston relative to the first cylinder,
(g) means to supply a fluid under pressure alternately to the two chambers of the first cylinder to drive the first piston relative to the first cylinder alternately in opposite directions,
(h) a closed circuit with a low friction head interconnecting the two chambers of the second cylinder,
(i) means providing an alternate circuit with a high friction head connecting the two chambers of the second cylinder.

(j) a liquid filling the two chambers of the second cylinder and both circuits, (k) valve means to selectively render only one of said circuits effective to control the rate of movement of the first piston relative to the first cylinder, and (l) a linear to rotary conversion mechanism contained within the second cylinder and having an output shaft external to the actuator, said conversion mechanism being driven by the relative linear movement of the second piston with respect to the second cylinder.

17. A hydropneumatic actuator as set forth in claim 16 wherein the conversion mechanism includes an elongated straight member disposed within the second cylinder and a member carried by the second piston, one of said members having a spiral irregularity, the other of said members having a matching and meshing irregularity, one of said members being non-rotatable, the other of said members being rotatable and connected to the output shaft.

18. A hydropneumatic actuator as set forth in claim 17 wherein the elongated straight member is formed with the spiral irregularity and wherein means is provided to mount said straight member for rotation and to restrain said straight member against axial movement relative to the second cylinder.

19. A hydropneumatic actuator as set forth in claim 18 wherein the spiral irregularity is a groove and wherein the matching irregularity of the member carried by the second piston is a ball.

References Cited in the file of this patent

UNITED STATES PATENTS

| 1,645,665 | Simpson | Oct. 18, 1927 |
| 1,653,373 | Rice | Dec. 20, 1927 |
| 2,632,426 | Geesink | Mar. 24, 1953 |